R. W. FOSTER.
SIFTER.
APPLICATION FILED DEC. 3, 1913.
1,118,927.
Patented Dec. 1, 1914.
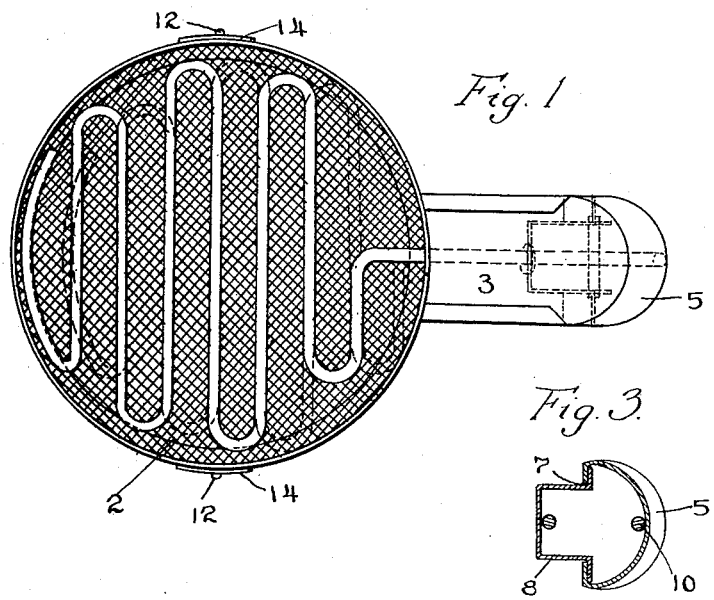
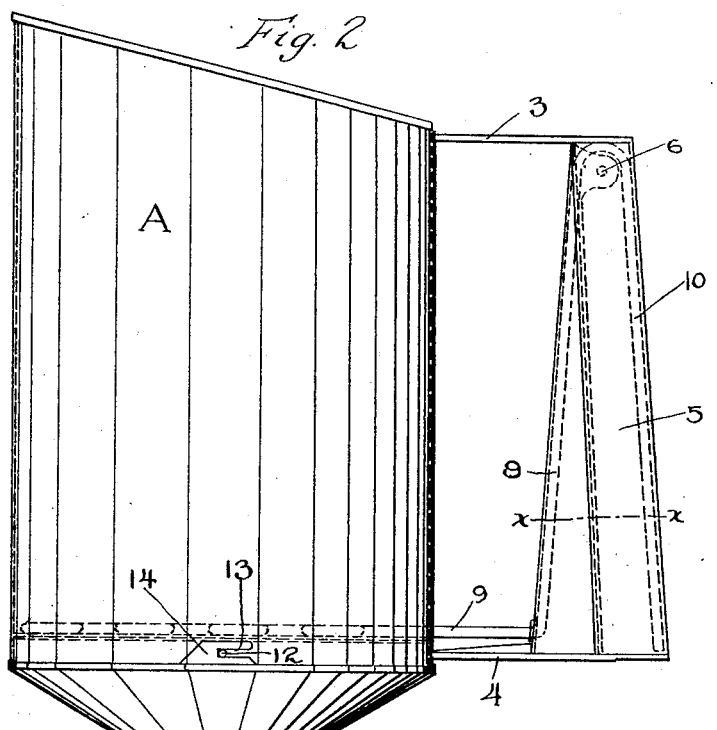
WITNESSES
INVENTOR
Reuben W. Foster
by Lothrop & Johnson
his Attorneys

UNITED STATES PATENT OFFICE.

REUBEN W. FOSTER, OF MANKATO, MINNESOTA.

SIFTER.

1,118,927.  Specification of Letters Patent.  Patented Dec. 1, 1914.

Application filed December 3, 1913. Serial No. 804,382.

*To all whom it may concern:*

Be it known that I, REUBEN W. FOSTER, a citizen of the United States, residing at Mankato, in the county of Blue Earth and State of Minnesota, have invented certain new and useful Improvements in Sifters, of which the following is a specification.

My invention relates to improvements in sifters designed particularly for sifting flour, its object being to provide a simple and efficient device provided with sifting mechanism actuatable by the holding hand.

To this end the invention consists in the features of construction, combination, and arrangement of parts hereinafter described and claimed.

In the accompanying drawings forming part of this specification, Figure 1 is a top view of my improved device; Fig. 2 is a side elevation of the same; and Fig. 3 is a section on line $x$—$x$ of Fig. 2.

Referring to the drawings, A represents a receptacle of suitable shape provided with a screen bottom 2. Supported upon the rear of the receptacle by top and bottom straps 3 and 4 is the upright handle 5, preferably rearwardly inclined toward its lower end as shown. Having pivotal support 6 in the upper end of the handle and extending downwardly in the slot 7 in the front of the handle is a bar 8. An agitator part 9, formed of a single piece of wire, extends inwardly from the lower end of the bar 8 through an opening in the bottom of the receptacle, the wire within the receptacle being doubled upon itself as shown in Fig. 1 to lie in serpentine position upon the openwork bottom 2. In order to normally hold the lower end of the bar swung forward upon its pivot 6, I preferably carry the wire 9 upwardly around the pivot 6 and then downwardly along the rear wall of the handle to constitute a spring portion 10. In order to discharge the matter being sifted in a restricted stream, I preferably provide an outlet funnel 11 adapted to be movably supported upon the lower end of the receptacle by means of pins 12 carried by the receptacle projecting into slots 13 in the upwardly extending side 14 of the funnel. While I have shown the bar 8 pivotally supported at its upper end in a slot in the front of the handle it may be otherwise supported in connection with the handle to be susceptible of a similar reciprocatory movement.

In use, with the receptacle filled with flour and being held by the handle in the user's hand the fingers will rest upon the bar 8 making it particularly easy to reciprocate the bar and with it the agitator, working the flour through the openwork bottom of the receptacle.

I claim as my invention:

A sifter of the class described comprising a receptacle provided with an openwork bottom, a side hollow handle supported on said receptacle and spaced therefrom, a bar pivotally supported at its upper end in a vertical slot in the front of said handle, said handle and bar being formed with normally overlapping side flanges, a spring interposed between said bar and handle and normally holding the lower end of the bar pushed forwardly, and an agitator device supported by the lower end of said bar and extending slidably through the adjacent wall of the receptacle, the outer end of said device standing above the perforated bottom of said receptacle.

In testimony whereof I affix my signature in presence of two witnesses.

REUBEN W. FOSTER.

Witnesses:
H. S. JOHNSON,
H. SWANSON.